A. D. McPHERSON.
POWER TRANSMITTING DEVICE.
APPLICATION FILED OCT. 23, 1919.
1,379,031.
Patented May 24, 1921.
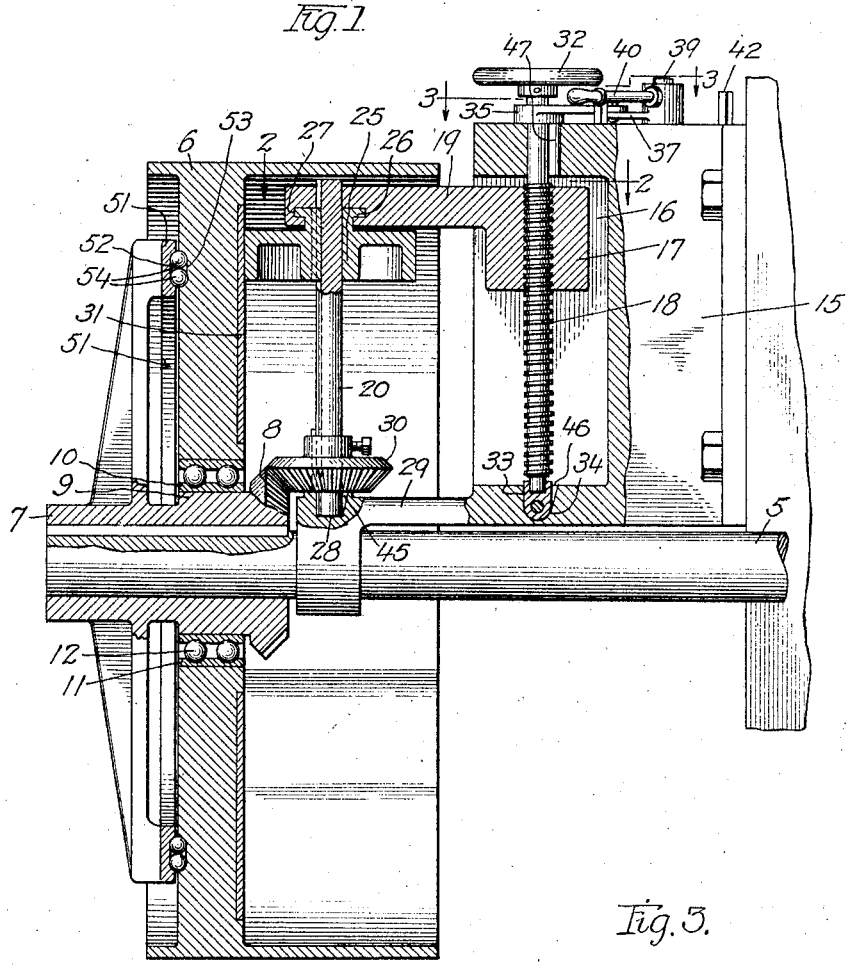
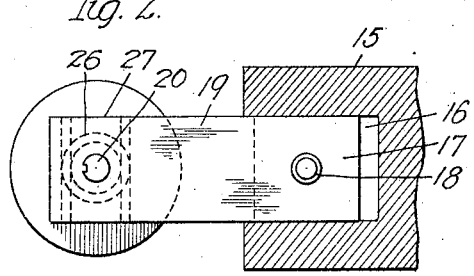
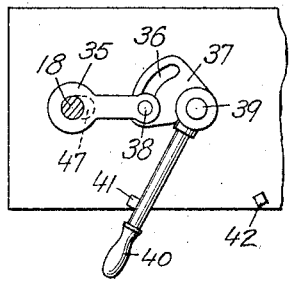
Inventor
Arthur D. McPherson
By: Foree Bain & Hinkle
Attys.

UNITED STATES PATENT OFFICE.

ARTHUR D. McPHERSON, OF CHICAGO, ILLINOIS.

POWER-TRANSMITTING DEVICE.

1,379,031.  Specification of Letters Patent.  Patented May 24, 1921.

Application filed October 23, 1919. Serial No. 332,768.

*To all whom it may concern:*

Be it known that I, ARTHUR D. MCPHERSON, a citizen of the United States, residing at Chicago, in the county of Cook and State of Illinois, have invented certain new and useful Improvements in Power-Transmitting Devices, of which the following is a specification.

This invention relates to power transmitting devices.

One of the objects of the invention is to provide an improved power transmitting device.

Another object is to provide an improved power transmitting device whereby the speed and torque between two rotatable shafts may be readily varied at will.

Another object is to provide a power transmitting device which is efficient, reliable and simple.

Other objects of the invention will appear from the specification and claims.

An embodiment of the invention is illustrated in the accompanying drawing, wherein—

Figure 1 is a vertical section through the device.

Fig. 2 is a section on the line 2—2 of Fig. 1, and

Fig. 3 is a section on the line 3—3 of Fig. 1.

The power transmitting device illustrated is intended to transmit power between a rotatable shaft 5, which may be considered the driving member and a belt pulley 6, which may be considered the driven member. Shaft 5 has a sleeve 7 keyed thereto. Sleeve 7 is provided at one end with a bevel gear wheel 8 which may be formed integrally therewith or rigidly secured thereto in any desired manner. Sleeve 7 also has a flange 9, which carries a bearing ring 10. Pulley 6 is provided with an axial opening through its center in which is held a bearing ring 11. Between rings 10 and 11 are located two races of bearing balls 12. Thus pulley 6 is rotatably carried upon shaft 7 through anti-friction ball bearings.

A bracket 15 is secured to a suitable support and carries the mechanism for transmitting power from shaft 5 to pulley 6 and for controlling the speed and torque of the transmission. Bracket 15 has a recess 16 in the front face thereof to receive the end of an adjustably supported block 17. Block 17 fits within recess 16 so that, although the block is free to slide, it cannot rotate. Block 17 has a threaded opening therethrough for a screw 18. It also has an extending arm 19, through which passes the upper end of a stud shaft 20.

Slidably mounted upon but keyed to rotate with shaft 20 is a friction wheel 25. The hub of wheel 25 is provided with a flange 26 which is adapted to be positioned within the groove of a cross slot 27 in arm 19. The lower end of shaft 20 rests in a seat 28 formed in an arm 29 extending from the lower end of bracket 15. Arm 29 may be provided with a collar to encircle shaft 5 to form a bearing therefor. Near the lower end of shaft 20 and engaging gear wheel 8 is a bevel pinion 30. Pinion 30 is rigidly secured to shaft 20. The radial face of pulley 6 is provided with a friction surface adapted to be engaged by friction wheel 25. This surface is formed by placing a friction disk 31 in the radial surface of the pulley. The power from shaft 5 is transmitted to pulley 6 through gear wheels 8 and 30, shaft 20, friction wheel 25 and disk 31. The speed and torque are dependent upon the distance wheel 25 is from the center of pulley 6.

The position of friction wheel 25 and consequently the speed and torque may be varied by raising and lowering friction wheel 25. Screw 28 is provided with a hand wheel 32 and at its bottom is provided with a socket bearing 33 resting in a seat 34 in bracket 15. The rotation of screw 18 by means of the hand wheel raises and lowers block 17 and consequently arm 19 and friction wheel 25. The speed and torque thus may be varied by rotating the hand wheel.

To disconnect shaft 5 and pulley 6 screw 18 is journaled in one end of a lever 35. The other end of lever 35 is pivoted in a slot 36 of a cam 37 by a pin 38. Cam 37 is pivoted to a post 39 carried by bracket 15 and has an operating lever 40. Slot 36 is eccentric relative to post 39 so that when lever 40 is turned, it moves the upper end of screw 18, and consequently the upper end of shaft 20, toward or away from pulley 6. This movement causes friction wheel 25 to approach and engage friction disk 31 or to be moved away from and out of engagement therewith. When lever 40 is against a stop 41, wheel 25 and disk 31 are in contact and shaft 5 drives pulley 6. When lever 40 is against stop 42, friction wheel 25 and surface 31 are separated and the driving connection between shaft 5 and pulley 6 is broken.

To provide for the slight lateral movement of the upper end of screw 18 and shaft 20, sockets 28 and 34 are slightly cored out on one side, as shown at 45 and 46, respectively, and the opening in bracket 15, through which screw 18 passes, is slightly elongated, as shown at 47.

To assist in resisting the thrust of friction wheel 25 and to strengthen and assist in the retention of pulley 6 in proper position, sleeve 7 is provided with a spider 50. The outer ends of the arms of spider 50 are interconnected by a continuous annular bearing ring 51. Ring 51 is provided with a bearing groove 52 and pulley 6 has a coöperating bearing groove 53. Within the ball race formed by grooves 52 and 53 are placed balls 54. This construction provides an anti-friction bearing for resisting the thrust of friction wheel 25.

This power transmission device has been found particularly useful in mills where it is desirable to transmit power between two members at varying speed and torque. When friction wheel 25 is near the outer edge of friction disk 31 the driven member is rotated slower than when the friction wheel is nearer the axis of the pulley, the torque, however, is greater. As friction wheel 25 is moved toward the axis of pulley 6 the speed increases and the torque decreases.

Having described my invention, what I claim is:—

1. A power transmitting device comprising a drive shaft, a pulley having an overhanging rim rotatably mounted thereon, a gear wheel rotated by said drive shaft, a driven shaft, a gear thereon meshing with the gear on said drive shaft, a friction wheel slidably mounted upon and rotated by said drive shaft and adapted to engage a radial surface of said pulley, said gear wheels, driven shaft and friction wheel within the driven pulley, a bracket, an arm slidably mounted on said bracket and carrying said wheel to vary the position thereof relative to the axis of said drive shaft and said pulley, and a screw for moving said arm.

2. A power transmitting device comprising a drive shaft, a pulley rotatably mounted thereon, a gear wheel rotated by said drive shaft, a driven shaft, a gear thereon meshing with the gear on said drive shaft, a friction wheel slidably mounted upon and rotated by said drive shaft and adapted to engage a radial surface of said pulley, a bracket, an arm slidably mounted on said bracket and carrying said wheel to vary the position thereof relative to the axis of said drive shaft and said pulley, a screw for moving said arm, and a cam supporting one end of said screw for moving the same toward and from said pulley to cause the engagement and disengagement of said wheel and said pulley.

3. A power transmitting device having a driving shaft; a sleeve rotatable therewith; a driven pulley, having a solid web rotatable about the sleeve; a spider rotatable with the sleeve and bearing on one side of said web; a speed changing shaft perpendicular to the driving shaft, on the opposite side of said web; a gear on said speed changing shaft; a gear meshing therewith, on said sleeve; a friction pulley engaging the web of the pulley and slidable on said speed changing shaft; means to move the friction pulley into engagement with the web of the pulley and means to move it radially of the driven pulley.

In testimony whereof I hereunto subscribe my name.

ARTHUR D. McPHERSON